US006668307B1

(12) United States Patent
Damron

(10) Patent No.: US 6,668,307 B1
(45) Date of Patent: Dec. 23, 2003

(54) SYSTEM AND METHOD FOR A SOFTWARE CONTROLLED CACHE

(75) Inventor: Peter C. Damron, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 384 days.

(21) Appl. No.: 09/677,092

(22) Filed: Sep. 29, 2000

(51) Int. Cl.[7] ............................................. G06F 12/00
(52) U.S. Cl. ...................................................... 711/137
(58) Field of Search ............................... 711/133, 134, 711/137

(56) References Cited

U.S. PATENT DOCUMENTS

| | | | | |
|---|---|---|---|---|
| 4,928,239 A | | 5/1990 | Baum et al. ................ | 364/200 |
| 5,185,878 A | | 2/1993 | Baror et al. ................ | 395/425 |
| 5,325,504 A | | 6/1994 | Tipley et al. ................ | 395/425 |
| 5,353,425 A | * | 10/1994 | Malamy et al. ............. | 711/144 |
| 5,390,318 A | | 2/1995 | Ramakrishnan et al. .... | 395/425 |
| 5,491,810 A | | 2/1996 | Allen ......................... | 395/444 |
| 5,546,559 A | | 8/1996 | Kyushima et al. .......... | 395/460 |
| 5,564,035 A | | 10/1996 | Lai ............................. | 395/471 |
| 5,652,858 A | | 7/1997 | Okada et al. | |
| 5,732,242 A | * | 3/1998 | Mowry ....................... | 711/136 |
| 5,778,432 A | | 7/1998 | Rubin et al. ................ | 711/135 |
| 5,822,757 A | * | 10/1998 | Chi ............................. | 711/129 |
| 5,829,025 A | * | 10/1998 | Mittal ........................ | 711/122 |
| 5,890,221 A | | 3/1999 | Liu et al. ..................... | 711/210 |
| 5,918,246 A | * | 6/1999 | Goodnow et al. ........... | 711/137 |
| 5,925,100 A | | 7/1999 | Drewry et al. .............. | 709/219 |
| 5,937,429 A | | 8/1999 | Kumar et al. ............... | 711/133 |
| 5,944,815 A | | 8/1999 | Witt .......................... | 712/207 |
| 5,996,061 A | * | 11/1999 | Lopez-Aguado et al. ... | 712/207 |
| 6,047,358 A | | 4/2000 | Jacobs ........................ | 711/133 |
| 6,065,100 A | | 5/2000 | Schafer et al. ............. | 711/137 |
| 6,202,129 B1 | * | 3/2001 | Palanca et al. ............. | 711/133 |
| 6,223,256 B1 | * | 4/2001 | Gaither ...................... | 711/134 |
| 6,314,490 B1 | * | 11/2001 | Morein ...................... | 711/3 |
| 6,574,712 B1 | * | 6/2003 | Kahle et al. ................ | 711/137 |

FOREIGN PATENT DOCUMENTS

EP           0 723 221 A2     7/1996

OTHER PUBLICATIONS

Magnus Karlsson et al., "A Prefetching Technique for Irregular Accesses to Linked Data Structures". High–Performance Computer Architecture, 2000. HPCA–6, Proceedings. Sixth International Symposium on Toulouse, France. Jan. 8, 2000, pp. 206–217. Los Alamitos, California, USA.
Unknown, "*Conditional Least–Recently–Used Data Cache Design to Support Multimedia Applications*", pp. 387–389, vol. 37, No. 02B, Feb. 1994, IBM Technical Disclosure Bulletin, New York, NY.

* cited by examiner

*Primary Examiner*—Kevin Verbrugge
(74) *Attorney, Agent, or Firm*—Martine & Penilla, LLP

(57) ABSTRACT

A system and method are provided for improved handling of data in a cache memory system (105) for caching data transferred between a processor (110) capable of executing a program and a main-memory (115). The cache memory system (105) has at least one cache (135) with several cache-lines (160) capable of caching data therein. In the method, a cache address space is provided for each cache (135) and special instructions are generated and inserted into the program to directly control caching of data in at least one of the cache-lines (160). Special instructions received in the cache memory system (105) are then executed to cache the data. The special instructions can be generated by a compiler during compiling of the program. Where the cache memory system (105) includes a set-associative-cache having a number of sets each with several cache-lines (160), the method can further include the step of determining which cache-line in a set to flush to main-memory (115) before caching new data to the set.

13 Claims, 2 Drawing Sheets

SYSTEM AND METHOD FOR A SOFTWARE CONTROLLED CACHE

CROSS REFERENCE TO RELATED APPLICATIONS

This application is related to commonly assigned, co-pending U.S. patent application Ser. No. 09/677,096 entitled SYSTEM AND METHOD FOR IDENTIFYING STREAMING-DATA filed on Sep. 29, 2000 now U.S. Pat. No. 6,598,124, and application Ser. No. 09/677,093 entitled CACHE MEMORY SYSTEM AND METHOD FOR MANAGING STREAMING-DATA filed on Sep. 29, 2000, now U.S. Pat. No. 6,578,111, both of which are incorporated herein by reference.

FIELD

The present invention relates generally to memory systems, and more particularly to cache memory systems and a method of operating the same that provides efficient handling of data.

BACKGROUND

Modern computer systems generally include a central processing unit (CPU) or processor for processing data and a memory system for storing operating instructions and data. Typically, the speed at which the processor can decode and execute instructions exceeds the speed at which instructions and data can be transferred between the memory system and the processor. Thus, the processor is often forced to wait for the memory system to respond. This delay is commonly known as memory latency. To reduce, if not eliminate, this time many computer systems now include a faster memory known as a cache memory between the processor and main-memory.

A cache memory reduces the memory latency period by temporarily storing a small subset of data from a lower-level memory such as a main-memory or mass-storage-device. When the processor needs information for an application, it first checks the cache. If the information is found in the cache (known as a cache-hit), the information will be retrieved from the cache and execution of the application will resume. If the information is not found in the cache (known as a cache-miss) then the processor will proceed to access the lower-level memories. Information accessed in the lower-level memories is simultaneously stored or written to the cache so that should the information be required again in the near future it can be obtained directly from the cache, thereby reducing or eliminating any memory latency on subsequent read operations.

Use of a cache can also reduce the memory latency period during write operations by writing to the cache. This reduces memory latency in two ways. First, it enables the processor to write at the much greater speed of the cache, and second, storing or loading the data into the cache enables it to be obtained directly from the cache should the processor need the data again in the near future.

Typically, the cache is divided logically into two main components or functional units. A data-store, where the cached information is actually stored, and a tag-field, a small area of memory used by the cache to keep track of the location in the memory where the associated data can be found. The data-store is structured or organized as a number of cache-lines each having a tag-field associated therewith, and each capable of storing multiple blocks of data. Typically, in modern computers each cache-line stores 32 or 64 blocks or bytes of data. The tag-field for each cache-line includes an index that uniquely identifies each cache-line in the cache, and a tag that is used in combination with the index to identify an address in lower-level memory from which data stored in the cache-line has been read from or written to. The tag-field for each cache-line also includes one or more bits, commonly known as a validity-bit, to indicate whether the cache-line contains valid data. In addition, the tag-field may contain other bits, for example, for indicating whether data at the location is dirty, that is has been modified but not written back to lower-level memory.

To speed up memory access operations, caches rely on principles of temporal and spacial-locality. These principles of locality are based on the assumption that, in general, a computer program accesses only a relatively small portion of the information available in computer memory in a given period of time. In particular, temporal locality holds that if some information is accessed once, it is likely to be accessed again soon, and spatial locality holds that if one memory location is accessed then other nearby memory locations are also likely to be accessed. Thus, in order to exploit temporal-locality, caches temporarily store information from a lower-level memory the first time it is accessed so that if it is accessed again soon it need not be retrieved from the lower-level memory. To exploit spatial-locality, caches transfer several blocks of data from contiguous addresses in lower-level memory, besides the requested block of data, each time data is written to the cache from lower-level memory.

The most important characteristic of a cache is its hit rate, that is the fraction of all memory accesses that are satisfied from the cache over a given period of time. This in turn depends in large part on how the cache is mapped to addresses in the lower-level memory. The choice of mapping technique is so critical to the design of the cache that the cache is often named after this choice. There are generally three different ways to map the cache to the addresses in memory, direct mapping, fully-associative and set-associative.

Direct-mapping, is the simplest way to map a cache to addresses in main-memory. In the direct-mapping method the number of cache-lines is determined, the addresses in memory divided into the same number of groups of addresses, and addresses in each group associated with one cache-line. For example, for a cache having $2^n$ cache-lines, the addresses in memory are divided into $2^n$ groups and each address in a group is mapped to a single cache-line. The lowest n address bits of an address corresponds to the index of the cache-line to which data from the address can be stored. The remaining top address bits are stored as a tag that identifies from which of the several possible addresses in the group the data in the cache-line originated. For example, to map a 64 megabyte (MB) main-memory to a 512 kilobyte (KB) direct-mapped cache having 16,384 cache-lines, each cache-line is shared by a group of 4,096 addresses in main-memory. To address 64-MB of memory requires 26 address bits since 64-MB is $2^{26}$ bytes. The lowest five of these address bits, A0 to A4, are ignored in the mapping process, although the processor will use them later to determine which of the 32 blocks of data in the cache-line to accesses. The next 14 address bits, A5 to A18, provide the index of the cache-line to which the address is mapped. Because any cache-line can hold data from any one of 4,096 possible addresses in main-memory, the next seven highest address bits, A19 to A25, are used as a tag to identify to the processor which of the addresses the cache-line holds data from. This scheme, while simple, can result in a cache-conflict or thrashing in which a sequence of accesses to memory repeatedly overwrites the same cache entry, resulting in a cache-miss on every access. This can happen, for example, if two blocks of data, which are mapped to the same set of cache locations, are needed simultaneously.

A fully-associative mapped cache avoids the cache-conflict ofthe directly mapped cache by allowing blocks of data from any address in main-memory to be stored anywhere in the cache. However, one problem with fully associative caches is that the whole main-memory address must be used as a tag, thereby increasing the size of the tag-field and reducing cache capacity for storing data. Also, because the requested address must be compared simultaneously (associatively) with all tags in the cache, the access time for the cache is increased.

A set-associative cache, is a compromise between the direct mapped and fully associative designs. In this design, the cache is broken into sets each having a number, 2, 4, 8 etc., of cache-lines and each address in main-memory is assigned to a set and can be stored in any one of the cache-lines within the set. Typically, such a cache is referred to as a n-way set associative cache where n is the number of cache-lines in each set.

Memory addresses are mapped to the set-associative cache in a manner similar to the directly-mapped cache. For example, to map a 64-MB main-memory having 26 address bits to a 512-KB 4-way set associative cache the cache is divided into 4,096 sets of 4 cache-lines each and 16,384 addresses in main-memory associated with each set. Address bits $A5$ to $A16$ of a memory address represent the index of the set to which the address maps to. The memory address can be mapped to any of the four cache-lines in the set. Because any cache-line within a set can hold data from any one of 16,384 possible memory addresses, the next nine highest address bits, $A17$ to $A25$, are used as a tag to identify to the processor which of the memory addresses the cache-line holds data from. Again, the lowest five address bits, $A0$ to $A4$, are ignored in the mapping process, although the processor will use them later to determine which of the 32 bytes of data in the cache-line to accesses.

When a fully-associative or a set-associative cache is full and it is desired to store another cache-line of data to the cache then a cache-line is selected to be written-back or flushed to main-memory or to a lower-level victim cache. The new data is then stored in place of the flushed cache-line. The cache-line to be flushed is chosen based on a replacement policy implemented via a replacement algorithm.

There are various different replacement algorithms that can be used. The most commonly utilized replacement algorithm is known as Least Recently Used (LRU). According to the LRU replacement algorithm, for each cache-line, a Cache-controller maintains in a register several status bits that keep track of the number of times in which the cache-line was last accessed. Each time one of the cache-lines is accessed, it is marked most recently used and the others are adjusted accordingly. A cache-line is selected to be flushed if it has been accessed (read or written to) less recently than any other cache-line. The LRU replacement policy is based on the assumption that, in general, the cache-line which has not been accessed for longest time is least likely to be accessed in the near future.

Other replacement schemes that are used include random replacement, an algorithm that picks any cache-line with equal probability, and First-In-First-Out (FIFO), algorithm that simply replaces the first cache-line loaded in a particular set or group of cache-lines.

Another commonly used method of reducing memory latency involves prefetching instructions or data from main-memory to the cache ahead of the time when it will actually be needed by the processor. Various approaches and mechanisms have been tried in an attempt to predict the processor's need ahead of time. For example, one approach described in U.S. Pat. No. 5,778,436, to Kedem et al., teaches a predictive caching system and method for prefetching data blocks in which a record of cache misses and hits are maintained in a prediction table, and data to be prefetched is determined based on the last cache-miss and the previous cache-hit.

While a significant improvement over cache systems without prefetching all ofthe prior art prefetching mechanisms suffer from a common short coming. Namely, all these mechanisms are embedded in the hardware or firmware of the Cache-controller, and the prefetch instruction invariably retrieves a set amount of data from a set range in memory and provides no other accommodating characteristics. Thus, while conventional prefetching mechanisms can work well in prefetching data stored sequentially, such as in an array where elements are stored contiguously, they can actually lead to a high number of cache-misses, by displacing needed data in the cache with erroneously prefetched data, and to unpredictable access times for non-sequential, pointer-linked data structures.

SUMMARY

The present invention overcomes the disadvantages of the prior art by providing a cache memory system and method for operating the same that realizes improved handling of data by providing predictable access times, reduced cache-misses and reduction of cache-conflicts.

In one aspect, the present invention is directed to a computer system having a cache memory system for caching data transferred between a processor executing a program and a main-memory. The cache memory system has at least one cache with multiple cache-lines each capable of caching data therein and is configured to enable a program executed on the processor to directly control caching of data in at least one ofthe cache-lines. Typically, the program includes computer program code adapted to: (i) create an address space for each cache to be controlled by the program and (ii) utilize special instructions to directly control caching of data in the cache. In one embodiment, the address space for each cache is created by'setting values in the control registers of the Cache-controller.

Alternatively, the address space can be created by system calls to an operating system to set up the address space. The system call can be a newly created special purpose system call or an adaption of an existing system call. For example, in most versions of UNIX, there is a system call or command, MMAP, which is normally used to map between a range of addresses in a user process's address space and a portion of some memory object, such as mapping a disk file into memory. It has been found that, in accordance with the present invention, that this system call, MMAP, can be used to set up the address space for each cache to be controlled by the program.

In one embodiment, the special instructions for directly controlling caching of data in the cache are generated by a compiler and inserted into the program during compiling of the program. Generally, the special instructions are instructions for loading data from cache to the register of the processor and for storing data from registers to the cache. Where the cache memory system has multiple caches, the special instructions can also include instructions to transfer data between caches. The special instructions can take the form of LOAD_L1_CACHE [r1], r2, STORE_L1_CACHE r1, [r2], PREFETCH_L1_CACHE [r1], [r2], READ or PREFETCH_L1_CACHE [r1], [r2], WRITE, where L1 is a particular cache and r1 is an address in the cache and r2 is a register in the processor to which data is to be loaded to or stored from. Alternatively, where the processor has a SPARC® architecture supporting Alternate Space Indexing (ASI) instructions, the special instructions are ASI instructions and can take the form of LOAD [A], [ASI], R, STORE [A], [ASI], R or PREFETCH [A], [ASI], R, where A is an address in main-memory and ASI is a number representing one of a number of possible ASI instructions.

In another embodiment, the cache memory system further includes a cache-controller configured to cache data to the cache, and the cache-controller has sole control over at least one cache-line while the program has sole control over at least one of the other cache-lines. In a cache memory system where the cache is a set-associative-cache having a number of sets each with several cache-lines, at least one cache-line of each set is under the sole control ofthe program. In one version of this embodiment, the processor includes a processor-state-register and a control bit in the processor-state-register is set to decide which cache-line or lines are controlled by the program.

In another aspect, the present invention provides a method for operating a cache memory system having at least one cache with a number of cache-lines capable of caching data therein. In the method, a cache address space is provided for each cache controlled by a program executed by a processor and special instructions are generated and inserted into the program to directly control caching of data in at least one of the cache-lines. The special instructions are received in the cache memory system and executed to cache data in the cache. As noted above, the step of generating special instructions can be accomplished during compiling of the program. Where the cache memory system includes a set-associative-cache with a number of sets each having several cache-lines for storing data therein, the method can further include the step of determining which cache-line in a set to flush to main-memory before caching new data to the set.

In yet another aspect, the invention is directed to a computer system that includes a processor capable of executing a program, a main-memory, a cache memory system capable of caching data transferred between the processor and the main-memory, the cache memory system having at least one cache with a number of cache-lines capable of caching data therein, and means for enabling the program executed on the processor to directly control caching of data in at least one of the cache-lines.

In one embodiment, the means for enabling the program executed on the processor to directly control caching of data includes computer program code adapted to: (i) create an address space for each cache to be controlled by the program, and (ii) utilize special instructions to directly control caching of data in the cache. The step of utilizing special instructions and inserting them into the program can be accomplished by a compiler during compiling of the program.

The system and method of the present invention is particularly useful in a computer system having a processor and one or more levels of hierarchically organized memory in addition to the cache memory system. For example, the system and method of the present invention can be used in a cache memory system coupled between the processor and a lower-level main-memory. Alternatively, the system and method of the present invention can also be used in a buffer or interface coupled between the processor or main-memory and a mass-storage-device such as a magnetic, optical or optical-magnetic disk drive.

The advantages of the present invention include: (i) predictable access times, (ii) reduced cache-misses, (iii) the reduction or elimination of cache conflicts and (iv) direct program control of what data is in certain portion of the cache.

BRIEF DESCRIPTION OF THE DRAWINGS

These and various other features and advantages of the present invention will be apparent upon reading of the following detailed description in conjunction with the accompanying drawings, where.

DETAILED DESCRIPTION

Figure 1:
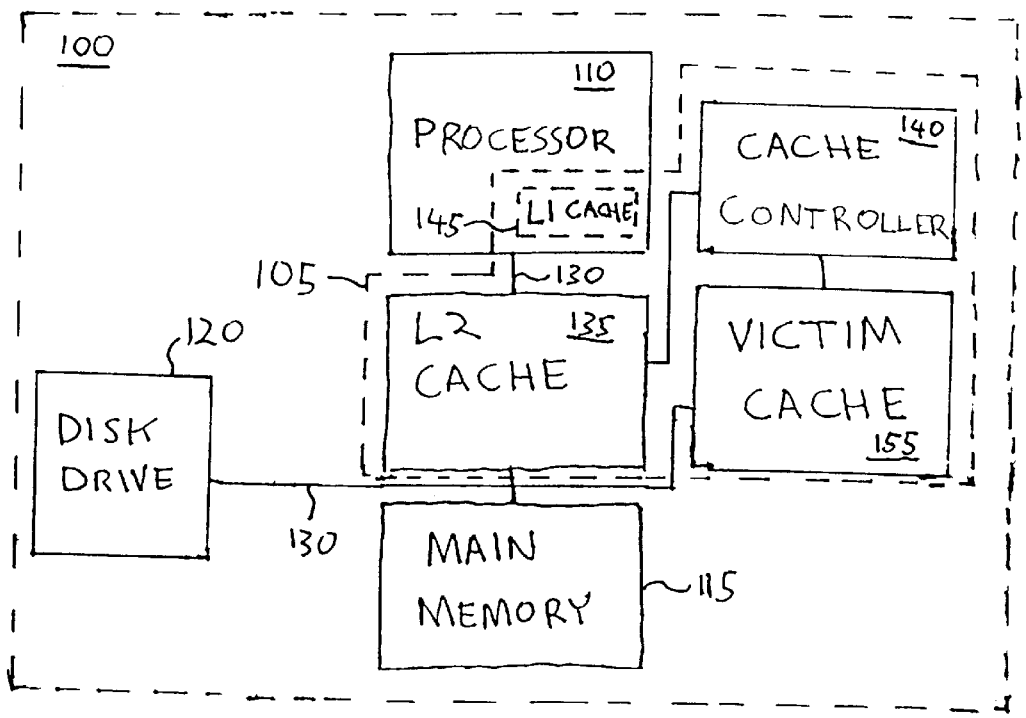
FIG. 1 is a block diagram illustrating a computer system having an embodiment of a cache memory system according to the present invention.

The present invention is directed to cache memory systems and methods of operating the same to provide improved handling of data in a cache memory system for caching data transferred between a processor capable of executing a program and a main-memory FIG. 1 shows a block diagram of an exemplary embodiment of a computer system 100 in which an embodiment of a cache memory system 105 of the present invention can be incorporated. For purposes of clarity, many ofthe details of computer systems that are widely known and are not relevant to the present invention have been omitted. In addition to cache memory system 105, computer system 100 typically includes central processing unit (CPU) or processor 110 for executing instructions for a computer application or program (not shown), main-memory 115 for storing data and instructions while running the application, a mass-data-storage device, such as disk drive 120, for a more permanent storage of data and instructions, system bus 130 coupling components of the computer system, and various input and output devices such as a monitor, keyboard or pointing device (not shown).

Cache memory system 105 has a cache memory or cache separate and distinct from the processor, shown here as level 2 (L2) cache 135, for temporarily storing data and instructions recently read from or written to lower level main-memory 115 or mass-storage-device 120. Cache-controller 140 controls cache operation and content of cache 135 by controlling mapping of memory addresses to the cache and the replacement of data in the cache in accordance with a cache replacement policy. Optionally, cache memory system 105 can further include primary or level 1 (L1) cache 145 integrally formed with processor 110 and one or more level 3 (L3) or victim caches 155 for temporarily storing data replaced or displaced from the L1or L2 cache to speed up subsequent read or write operations. L1 cache 145 typically has a capacity of from about 1 to 64 KB, while lower-level L2 and L3 caches 135, 155, can have capacities of from about 128 KB to 64 MB in size. Although not shown, cache memory system 105 can also have separate caches for instructions and data, which can be accessed at the same time, thereby allowing an instruction fetch to overlap with a data read or write.

The caches 135, 145, 155, can be organized as directly-mapped, fully-associative or set-associative caches as described above. In one embodiment, the caches 135, 145, 155, are organized as n-way set-associative caches, where n is an integer of two or more.

Figure 2:
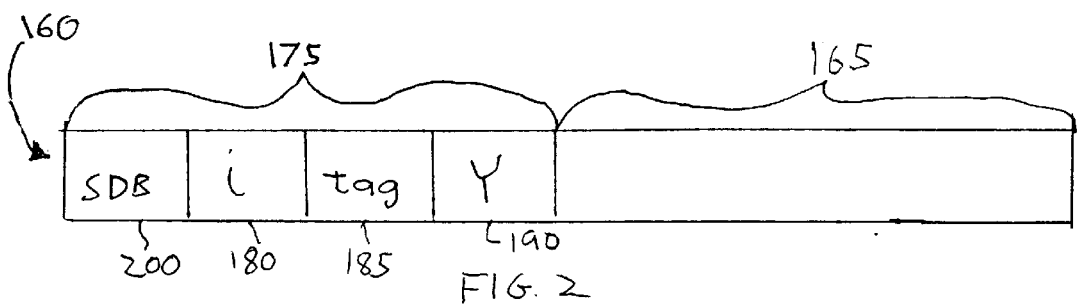
FIG. 2 illustrates a schema of a cache-line of a cache in cache memory system according to an embodiment of the present invention.
Figure 3:
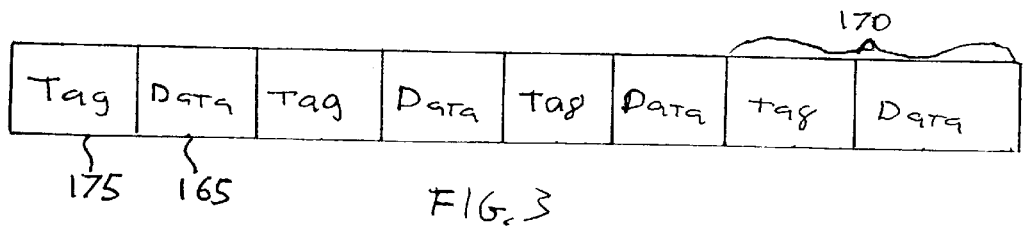
FIG. 3 is a block diagram illustrating a schema of a set in a four-way set associative cache according to an embodiment of the present invention.

FIG. 2 illustrates a schema of cache-line 160 of cache 135, 145, 155, in cache memory system 105 of FIG. 1. Cache-line 160 includes data-store 165 capable of storing multiple blocks or bytes of data, and tag-field 175 containing address information and control bits. The address information includes index 180 that uniquely identifies each cache-line 160 in cache 135, 145, 155, and a tag 185 that is used in combination with index 180 to identify an address in main-memory 115 from which data stored in the cache-line has been read from or written to. Often index 180 is not stored in cache 135, 145, 155, but is implicit, provided by the location or address of cache-line 160 within the cache. Control bits can include validity bit 190 which indicates if the cache-line contains valid data, bits for implementing a replacement algorithm, and a dirty-data-bit for indicating whether data in the cache-line has been modified but not written-back to lower-level memory FIG. 3 is a block diagram illustrating a schema of a set in a four-way set associative cache according to an embodiment of the present invention. Each way 170 has a data store 165 and tag-field 175 associated therewith. In accordance with the present invention, in one embodiment the program has sole control over at least one of the ways 170 in each set while the cache-controller 140 has control over the remainder of the ways.

Figure 4:
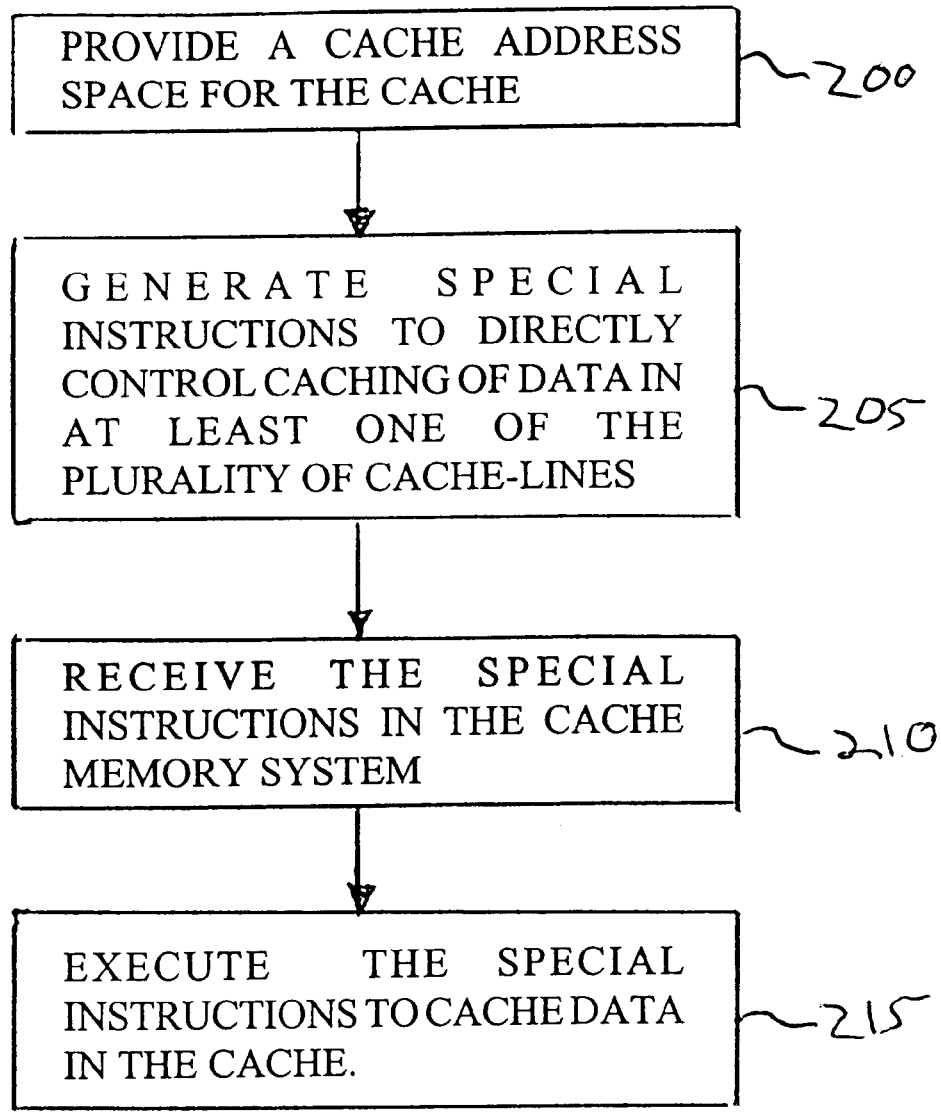
FIG. 4 is a flowchart showing a process for operating a cache memory system according to an embodiment of the present invention to directly control caching of data in a cache.

A method for operating cache memory system to provide efficient handling of data and to eliminate unpredictable access times will now be described with reference to FIGS. 1 and 4. FIG. 4 is a flowchart showing an embodiment of a process for operating cache memory system 105 having at least one cache 135, 145, 155, for caching data transferred between processor 110 and main-memory 115 with a plurality of cache-lines 160 capable of caching data therein according to an embodiment of the present invention. In the method, a cache address space is provided for the cache 135, 145, 155 (step 200), and special instructions generated (step 205) that when executed in a program by processor 110 enable it to directly control caching of data in at least one of the plurality of cache-lines 160. The special instructions are received in the cache memory system 105 (step 210) and executed to cache data in the cache 135, 145, 155 (step 215). Optionally, where the cache memory system 105 includes a set-associative-cache with a number of sets each having several cache-lines 160, the method further includes the step (not shown) of determining which cache-line in a set to flush to main-memory 115 before caching new data to the set.

In one embodiment of the method of the present invention, the step of generating special instructions (step 205) involves inserting special instructions into the program while compiling of the program during an optimization run. A compiler is a program that converts a program from a source or programming language to a machine language or object code. The compiler analyzes and determines data caching requirements, and inserts instructions into the machine level instructions for more accurate and efficient cache operation. By being able to directly control the cache 135, 145, 155, the compiler can more accurately predict the speed of execution of the resulting code. Consider, for example, a loop within a program. Loops are readily recognized as a sequence of code that is iteratively executed some number of times. The sequence of such operations is predictable because the same set of operations is repeated for each iteration of the loop. It is common practice in an application program to maintain an index variable for each loop that is provided with an initial value, and that is incremented by a constant amount for each loop iteration until the index variable reaches a final value. The index variable is often used to address elements of arrays that correspond to a regular sequence of memory locations. Such array references by a loop can lead to overwriting of data that will be needed in the future, cache-conflict, resulting in a significant number of cache-misses. A compiler according to the present is able to deduce the number of cycles required by a repetitively executed sequence of code, such as a loop, and then insert prefetch instructions into loops such that array elements that are likely to be needed in future iterations are retrieved ahead of time. Ideally, the instructions are inserted far enough in advance that by the time the data is actually required by the processor, it has been retrieved from memory and stored in the cache.

Alternatively, the special instructions can be written into the program by the author of the executable program in an assembly language. It will be appreciated that methods can be used in the same program. That is at points or places in the program where performance is critical the present invention allows the programmer to adapt the prefetching to the precise needs of the program, while the compiler is allowed to insert prefetch instruction at other, less critical points in the program as required.

Generally, the special instructions can take the form of LOAD_L1_CACHE [r1], r2; STORE_L1_CACHE r1, [r2]; PREFETCH_L1_CACHE [r1], [r2], READ; and PREFETCH_L1_CACHE [r1], [r2], WRITE, where L1 is a cache and r1 and r2 are registers in processor 110 to which the data is to be loaded from or to. Where the cache memory system 105 includes multiple caches 135, 145, 155, the special instructions can also include instructions to transfer data between caches.

In another embodiment, processor 110 has an architecture supporting alternate address space indexing and alternate or special load instructions, and the step of generating special instructions, step 205, involves receiving from processor 110 pre-existing special instructions. For example, processor 110 can have a SPARC® architecture supporting Alternate Space Indexing (ASI), and th the step of generating special instructions, step 205, involves using an ASI instruction to control caching of data in the cache 135, 145, 155. SPARC® or scalable processor architecture is an instruction set architecture designed by Sun Microsystems, Inc., of Palo Alto, Calif. ASI instructions are an alternate set of load (or store) instructions originally developed for running diagnostics on the processor and for providing access to memory not accessible using ordinary instructions (non-faulting memory). There are 256 possible ASI address spaces available that can be specified. The ASI instruction used can take the form of LOAD [A], [ASI], R, STORE [A], [ASI], R, and PREFETCH [A], [ASI], R, where A is the address of the data in main-memory 115, R is a register in processor 110 to which the data is to be loaded from or to and ASI is a number representing one of 256 possible ASI address spaces.

It is to be understood that even though numerous characteristics and advantages of certain embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

what is claimed is:

1. A computer system comprising:
a processor capable of executing a program, the program comprising computer program code adapted to:
create an address space for each cache to be controlled by the program; and
utilize special instructions to directly control caching of data in the cache;
a main memory;
a cache memory system capable of caching data transferred between the processor and the main-memory, the cache memory system having at least one cache with a plurality of cache-lines capable of caching data therein and configured to enable a program executed on the processor to directly control caching of data in at least one of the plurality of cache-lines; and
a cache-controller having a plurality of control registers, and wherein the address space for each cache is created by loading values into control registers.

2. A computer system comprising:
a processor capable of executing a program, the program comprising computer program code adapted to:
create an address space for each cache to be controlled by the program; and
utilize special instructions to directly control caching of data in the cache;
a main memory;
a cache memory system capable of caching data transferred between the processor and the main-memory, the cache memory system having at least one cache with a plurality of cache-lines capable of caching data therein and configured to enable a program executed on the processor to directly control caching of data in at least one of the plurality of cache-lines; and
an operating system, wherein the address space for each cache is created by a system call to the operating system to set up the address space.

3. A computer system comprising:
a processor capable of executing a program;
a main memory;
a cache memory system capable of caching data transferred between the processor and the main memory, the cache memory system having at least one cache with a plurality of cache-lines capable of caching data therein and configured to enable a program executed on the processor to directly control caching of data in at least one of the plurality of cache-lines, wherein the program executed on the processor comprises computer program code adapted to utilize special instructions to directly control caching of data in the cache; and
a compiler for analyzing and determining requirements for caching the data to be transferred between the processor and the main memory, the compiler operating while the processor directly controls caching of data in at least one of the plurality of cache-lines, the compiler being configured to insert the program code into the program during compiling of the program.

4. A computer system comprising:
a processor capable of executing a program, the processor comprising a SPARC® architecture supporting Alternate Space Indexing (ASI) instructions, the program comprising computer program code adapted to:
create an address space for each cache to be controlled by the program; and
utilize special instructions to directly control caching of data in the cache, wherein the special instructions are ASI instructions are selected from the group consisting of:
LOAD[A], [ASI], R;
STORE [A], [ASI], R; and
PREFETCH [A], [ASI], R,
where ASI is a number representing one of a plurality of ASI instructions;
a main memory;
a cache memory system capable of caching data transferred between the processor and the main-memory, the cache memory system having at least one cache with a plurality of cache-lines capable of caching data therein and configured to enable a program executed on the processor to directly control caching of data in at least one of the plurality of cache-lines.

5. A computer system comprising:
a processor capable of executing a program;
a main memory;
a cache memory system capable of caching data transferred between the processor and the main-memory, the cache memory system having at least one cache with a plurality of cache-lines capable of caching data therein and configured to enable a program executed on the processor to directly control caching of data in at least one of the plurality of cache-lines; and
a hardware-cache-controller configured to cache data to the cache, wherein the cache-controller has sole control over at least one of the plurality of cache-lines and the program has sole control over at least one of the plurality of cache-lines.

6. A computer system according to claims 5 wherein the processor comprises a processor-state-register and wherein a control bit in the processor-state-register determines which cache-lines are controlled by the program.

7. A computer system according to claim 5 wherein the cache memory system comprises a set-associative-cache with a plurality of sets each comprising a plurality of cache-lines and wherein at least one cache-line of each set is under the sole control of the program.

8. A computer system according to claims 7 wherein the processor comprises a processor-state-register and wherein a control bit in the processor-state-register determines which cache-lines are controlled by the program.

9. A computer system according to claim 5 wherein both the hardware-cache-controller and the program are capable of determining a cache address from a virtual address provided by the program.

10. In a cache memory system capable of caching data transferred between a processor and a main memory, the cache memory system having at least one cache with a plurality of cache-lines capable of caching data therein, a method of managing the cache memory system to provide efficient handling of data, the method comprising the steps of:

providing a cache address space for the cache;

generating in a program executed by the processor special instructions to directly control caching of data in at least one of the plurality of cache-lines, the generating of the special instructions comprising analyzing and determining requirements for caching the data to be transferred between the processor and the main memory, the analyzing and determining being performed during data transfer steps of the processor, the generating further comprising compiling the program and inserting the special instructions into the program during the compiling of the program;

receiving the special instructions in the cache memory system; and executing instructions to cache data in the cache.

11. In cache memory system capable of caching data transferred between a processor and a main-memory, the cache memory system having at least one cache with a plurality of cache-lines capable of caching data therein, a method of managing the cache memory system to provide efficient handling of data, the method comprising steps of:

providing a cache address space for the cache;

generating in a program executed by the processor special instructions to directly control caching of data in at least one of the plurality of cache-lines , wherein the special instructions are selected from the group consisting of:
LOAD_L1_CACHE[r1], r2;
STORE_L1_CACHE r1, [r2];
PREFETCH_L1_CACHE [r1], [r2], READ; and
PREFETCH_L1_CACHE [r1], [r2], WRITE;

receiving the special instructions in the cache memory system; and executing instructions to cache data in the cache.

12. In cache memory system capable of caching data transferred between a processor and a main-memory, wherein the processor comprises a SPARC® architecture supporting Alternate Space Indexing (ASI) instructions; the cache memory system having at least one cache with a plurality of cache-lines capable of caching data therein, a method of managing the cache memory system to provide efficient handling of data, the method comprising steps of:

providing a cache address space for the cache;

generating in a program executed by the processor special instructions to directly control caching of data in at least one of the plurality of cache-lines, wherein the special instructions are ASI instructions selected from the group consisting of:
LOAD [A], [ASI], R;
STORE [A], [ASI], R; and
PREFETCH [A], [ASI], R,
where ASI is a number representing one of a plurality of ASI instructions;

receiving the special instructions in the cache memory system; and executing instructions to cache data in the cache.

13. In cache memory system capable of caching data transferred between a processor and a main-memory, the cache memory system having multiple caches each with a plurality of cache-lines capable of caching data therein, a method of managing the cache memory system to provide efficient handling of data, the method comprising steps of:

providing a cache address space for the cache;

generating in a program executed by the processor special instructions to directly control caching of data in at least one of the plurality of cache-lines, wherein the special instructions include instructions to transfer data between caches;

receiving the special instructions in the cache memory system; and executing instructions to cache data in the cache.

* * * * *